(12) United States Patent
Li et al.

(10) Patent No.: US 9,367,713 B2
(45) Date of Patent: Jun. 14, 2016

(54) CONTACTLESS COMMUNICATION DEVICE

(75) Inventors: Wei Li, Shanghai (CN); Yifei Liu, Shanghai (CN); Yixin Shi, Shanghai (CN); Tingsong Luo, Shanghai (CN)

(73) Assignee: Shanghai Fudan Microelectronics Group Company Limited, Shanghai (CN)

( * ) Notice: Subject to any disclaimer, the term of this patent is extended or adjusted under 35 U.S.C. 154(b) by 755 days.

(21) Appl. No.: 13/639,306

(22) PCT Filed: Dec. 14, 2010

(86) PCT No.: PCT/CN2010/079766
§ 371 (c)(1),
(2), (4) Date: Feb. 6, 2013

(87) PCT Pub. No.: WO2011/124078
PCT Pub. Date: Oct. 13, 2011

(65) Prior Publication Data
US 2013/0127600 A1  May 23, 2013

(30) Foreign Application Priority Data
Apr. 6, 2010 (CN) .......................... 2010 1 0149421

(51) Int. Cl.
*G06K 19/06* (2006.01)
*G06K 7/01* (2006.01)
*G06K 7/10* (2006.01)
(Continued)

(52) U.S. Cl.
CPC .............. *G06K 7/01* (2013.01); *G06K 7/10237* (2013.01); *H04B 5/0031* (2013.01); *H04B 5/0037* (2013.01); *H04B 5/0075* (2013.01); *H04M 1/675* (2013.01); *H04M 2250/04* (2013.01)

(58) Field of Classification Search
USPC .................................. 235/492, 451; 340/10.5
See application file for complete search history.

(56) References Cited

U.S. PATENT DOCUMENTS 7,558,110 B2   7/2009  Mizushima et al.
7,660,574 B2   2/2010  Niimi
8,015,592 B2 * 9/2011  Doughty et al. ................... 726/2
(Continued)

FOREIGN PATENT DOCUMENTS

CN        1753415 A      3/2006
CN      101064893 A     10/2007
(Continued)

*Primary Examiner* — Ahshik Kim
(74) *Attorney, Agent, or Firm* — Blank Rome LLP; Charles R. Wolfe, Jr.

(57) ABSTRACT

A contactless communication device comprises a contactless front chip, a security chip concentrator and a security chipset. Wherein, said security chipset contains more than two security chips for storing and processing the contactless application data; said contactless front chip is used for implementing the interaction between said security chip and the external contactless field; said security chip concentrator, which is connected with the contactless front chip and with the security chip of the security chipset, is used for selecting a security chip based on the contactless application and implementing the connection between the selected security chip and the contactless front chip. The contactless communication device of the present invention is based on the application mode of multi-card for multi-use so that different providers can independently issue security chips separated from the contactless communication device, then the problems of data security, user management and so on caused by single-card for multi-use are avoided.

19 Claims, 8 Drawing Sheets

(51) Int. Cl.
*H04M 1/675* (2006.01)
*H04B 5/00* (2006.01)

(56) References Cited

U.S. PATENT DOCUMENTS

| 8,433,367 | B2* | 4/2013 | Oh et al. ........................ 455/558 |
| 2010/0012721 | A1* | 1/2010 | Jain et al. ...................... 235/380 |
| 2010/0108772 | A1* | 5/2010 | Hartel ........................... 235/492 |

FOREIGN PATENT DOCUMENTS

| CN | 200990090 Y | 12/2007 |
| CN | 101159027 | 4/2008 |
| CN | 101226581 | 7/2008 |
| CN | 101894290 A | 11/2010 |
| CN | 101916950 A | 12/2010 |

* cited by examiner

CONTACTLESS COMMUNICATION DEVICE

CROSS REFERENCE RELATED APPLICATIONS

The present application is a Section 371 National Stage Application of International Application No. PCT/CN2010/079766, filed on Dec. 14, 2010, which claims the priority of Chinese Patent Application No. 201010149421.2, entitled "Contactless Communication Device", and filed on Apr. 6, 2010, the entire disclosure of which is incorporated herein by reference.

FIELD OF THE INVENTION

The present invention generally relates to a mobile communication terminal, and more particularly, to a contactless communication device.

BACKGROUND OF THE INVENTION

In recent years, as the radio-frequency identification (RFID) technology develops, electronic payment is widely applied in daily life by performing the payment function in the form of smart cards such as credit cards, transportation cards, and the like. Electronic payment brings great convenience to people's daily life, especially in fixed sites for conducting business operations, where mature technologies and stable markets are developed and formed.

With further development of the electronic payment services, the requirement for combination of a smart card with a mobile communication device emerges. The smart card is supposed to have a display function so that people can inquiry data information stored in the smart card at any time; and the smart card is also supposed to have a communication function and perform real time communication with host computers of a smart card system to further realize functions such as recharging an electronic wallet remotely. In other words, the smart card is supposed to be integrated into a mobile phone so that a powerful communication and data processing function of the mobile phone can be used to realize services such as electronic payment, electronic tag identification, and the like.

In 2004, the near field communication technology (NFC) that combines a contactless card, a contactless card reader, and a mobile terminal aroused wide public concern. And then telecom operators, bank organizations, and terminal device suppliers plunges into the near field communication technology with immense zeal and attends to relative technical development aggressively. After several years' development and standardization, technical standards and specifications are gradually improved and tend to be mature. But for various reasons, there is still no mature product based on the near field communication technology showing up in market.

Theoretically, there is no obvious technical obstacle in application and promotion of the near field communication technology, because technologies adopted in the near field communication have been mature and proved by the market and chips conforming to relative standards and specifications of the near field communication technology have been issued. In fact, the ultimate reason why there is no breakthrough about mobile terminal products based on the near field communication technology is that it is difficult to determine service modes.

There are three service modes corresponding to three application functions, which are a point to point communication function, a reader/writer function, and a card simulation function. The three application functions are described as follows.

At first, the point to point communication function supports data communication between two mobile terminals in a short distance (the short distance in near field communication is generally less than ten centimeters, and it may be shorted to be less than 5 centimeters for a mobile terminal because of its antenna area or metal shield), and at a low rate (generally 212K bits/s or 414K bits/s). The point to point communication function is typically applied in electronic business cards exchanging, calendar synchronization, and wireless network matching (bluetooth or WiFi technology). But for now, the point to point communication function is auxiliary rather than a necessary function for a user, and is developed by mobile terminal manufacturing companies.

Secondly, with the reader/writer function, mobile terminals can identify and read external high frequency electronic tags. The reader/writer function is typically applied in intelligent posters with embedded high frequency electronic tags, so that mobile terminals can acquire network links and start network access by reading the data information in the high frequency electronic tags. To realize the reader/writer function, mobile terminals are combined with the high frequency electronic tags, which can be further applied in electronic tag logistics management, tracking and guarding against falsification of products, and even an internet of things in the future. Therefore, there is a huge potential for development of the reader/writer function. But it is probably that the reader/writer function may be further developed and applied only after popularization of near field communication terminals. And at present, early period of promotion of the near field communication terminals, the function does not play a leading role.

At last, with the card simulation function, mobile terminals are used like a contactless smart card to realize functions such as electronic payment (generally occurs in small amount and on-the-spot trades in super markets, restaurants and the like), transportation cards (electronic payment in special business), electronic entrance guard, electronic ticket (electronic entrance guard in special applications), and the like. Taking advantage of the mobile terminals, the simulation smart cards bring great convenience to users: for a personal user, compared with conventional smart cards, the simulation smart cards can provide data processing functions such as local data inquiry, remote recharging and the like; for a system user, some new services, such as mobile payment and the like, can be provided.

It can be seen that, the card simulation function predominates in early period of development of the near field communication terminals, and as described above, other functions such as the reader/writer function may be further developed and applied only after popularization of the near field communication terminals. Therefore, recently, relative application based on the card simulation function becomes a focus of development and promotion.

As for the card simulation function, there is still a contactless smart card, but the carrier of the smart card is changed to be a mobile terminal. In a solution for the near field communication, a dual-chip structure is provided, namely, a contactless front (CLF) chip and a security (SE) chip. The contactless front chip is adapted for processing contactless radio frequency interfaces and communication protocols, and the security chip is adapted for processing smart card applications and data management. Nowadays, many kinds of solutions for the near field communication emerge at home and abroad.

NXP company provides a typical solution for the near field communication, which is one of the earliest solution. As shown in FIG. 1, in the solution, a near field communication terminal includes a security chip 101, a contactless front chip 103, an antenna 105, a host computer chip 107 and a subscriber identification module (SIM) card 109. The security chip 101 is connected with contactless front chip 103 through a SignIn-SignOut connection (S2C) interface (such as an ECMA-373NFC interface) to realize bi-direction data communication. The security chip 101 is adapted for data storing and security management of a smart card. The contactless front chip 103 is adapted for converting S2C signals and external contactless signals, and exchanging communication application data and instructions with the host computer chip 107. The security chip 101 and the contactless front chip 103 can also be connected to each other through a contact IC card interface (such as ISO7816) which is mainly used to realize the reader/writer function of near field communication, where the security chip 101 acts as a secure access module of the reader/writer. In practical application, the security chip 101 may be a security chip Smart MX made by NXP company, the contactless front chip 103 may be a contactless front chip PN511 made by NXP company, and host computer chip 107 is a base band unit.

A serial of new applications realized by the near field communication terminal, such as electronic payment, electronic transportation cards, guarding against falsification, and the like, bring telecom operators with enormous business opportunities, and become an important developing trend of mobile phones and smart card industry. Some involved organizations provide a near field communication solution based on a signal wire protocol (SWP). The solution combines an SIM card and a security chip together, and uses redefined pins of the SIM card to communicate with a contactless front chip, so as to realize the near field communication.

FIG. 2 is a schematic structural view of a conventional contactless communication device based on the signal wire protocol. As shown in FIG. 2, the contactless communication device includes a SWP SIM card 201, a contactless front chip 203, an antenna 205 and a host computer chip 207. The SWP SIM 201 is adapted for storing information of a conventional SIM card and data information of a security chip. Pins C6 and C1 of the SWP SIM unit 201 are redefined and connected with the contactless front chip 203. The pin C1 is a power pin, and is indirectly powered up by a standard power supply through the contactless front chip 203, unlike being directly powered by a standard power supply provided by the host computer chip 207 in other practical applications, so that the contactless front chip 203 still can provide a working power for the SWP SIM unit 201 by creating inductive charges in a contactless field of an external reader/writer (an electromagnetic field created by the external reader/writer) even when the device has no battery power supply. The pin C6 is a single wire input-out (SWIO) data pin and exchanges data with the contactless front chip 203.

The near field communication solution based on the SWP SIM card makes a good use of relative technologies about SIM card, and is not difficult to realize. However, the SWP SIM card in the solution mainly corresponds to near field communication applications provided by telecom operators, and it is hard to realize cross-operator or cross-industry near field communication applications, because of different management requirements by different industries.

In order to meet the requirements of different near field communication application, the conventional SIM card standard needs to be updated and the SWP SIM card needs to comply with the standard of a global platform card. Namely, the SWP SIM card can store data information of many kinds of applications, so as to meet requirements of different applications. However, it is difficult to practice because of lots of limitations from policies and real operations.

Besides the above solution, there is also provided a mobile payment solution based on a dual-interface card, such as a dual-interface SIM card, and a dual-interface secure digital memory card. In the dual-interface SIM card, there are 8 pins, expanding from 6 pins of a conventional SIM card, the additional two pins are adapted for connecting with contactless antennas. But the additional pins in the dual-interface SIM card conflicts with high speed pins defined in ETSI TS102 600 standard enacted by European Telecommunications Standards Institute. In the dual-interface secure digital memory card, a contactless card is integrated in a memory card, and there are also two additional pins, which is similar to those in the dual-interface SIM card.

The solution based on a dual-interface card is one of the easiest methods to realize a contactless smart card function. But only one contactless antenna can be configured in one mobile terminal, and requirements to antennas of a contactless front chip is different from those of the dual-interface SIM card and the dual-interface secure digital memory card, so it is difficult for the mobile phone manufacturing companies to choose a solution. The most important point influencing the solution based on a dual-interface card is the consistency of contactless radio frequencies. A contactless function in the mobile terminal requires a card and an antenna integrated as a whole, but in the solution based on a dual-interface card, the card and the mobile terminal integrated with contactless antennas are two kinds of independent products, made by different suppliers, and fixed together to realize the contactless function. Therefore, because of the many-to-many match between the card and the mobile terminal provided by different suppliers, it is difficult to make the contactless radio frequency performance consistent.

From above, in the conventional art, a solution based on one-card multiple-use or a dual-interface card is generally applied in the near field communication technology. As for the one-card multiple-use solution, because different industries have different management modes, laws and policies, it is difficult to combine many kinds of applications. As for the solution based on a dual-interface card, it is difficult to achieve the consistency of contactless performance. Therefore, there is a need to provide a new contactless communication device to solve the above problems.

BRIEF SUMMARY OF THE INVENTION

As described above, problems such as data security, user management, and the like, may be caused by the one-card multiple-use solution in contactless applications.

To solve the above problems, an embodiment of the present disclosure provides a contactless communication device, including: a contactless front chip, a security chip concentrator and a security chipset. The security chipset includes more than two security chips and is adapted for storing and processing contactless application data.

The contactless front chip is adapted for realizing interaction between the security chips and an external contactless field.

The security chip concentrator is connected with the security chips and the contactless front chip, and the security chip concentrator is adapted for selecting a security chip according to a contactless application and realizing connection between the selected security chip and the contactless front chip.

Another embodiment of the present disclosure further provides a security chip concentrator, configured in the contactless communication device, including: multiple contactless application interfaces connected with security chips, adapted for connecting a security chipset and a contactless front chip. The security chipset includes one or more security chips.

Compared with the prior art, the embodiments of the present disclosure have the following advantages.

1. A security chip concentrator is configured to switch between different security chips, so that a contactless communication terminal can be installed with and support multiple security chips synchronously which correspond to different contactless applications.

2. The multiple security chips may be integrated in or separated from the contactless communication terminal. Namely, the security chips and the contactless communication terminal may be provided by operators and mobile terminal manufacturing companies respectively. When the security chips are separated from the contactless communication terminal, the mobile terminal manufacturing companies can independently develop and manufacture general contactless communication terminals, which makes division of duties clear-cut in an industrial chain.

3. The security chips may include a memory card structure and have pins being compatible with the single wire protocol, so that the contactless communication terminal still can induce power from an external contactless field through a contactless front chip when it has no battery power supply, which can greatly broaden applications of contactless applications.

BRIEF DESCRIPTION OF THE DRAWINGS

The accompanying drawings, which are incorporated in and form a part of the specification, illustrate embodiments of the disclosure and, together with the description, further serve to explain the principles of the embodiments of the disclosure and to enable a person skilled in the art to make and use the invention. It is noted that the drawings are provided for illustrative purposes only and, as such, they are not drawn to scale. Also, the same or similar reference signs represent the same or similar components in the accompanying drawings.

DETAILED DESCRIPTION OF THE INVENTION

Figure 1:
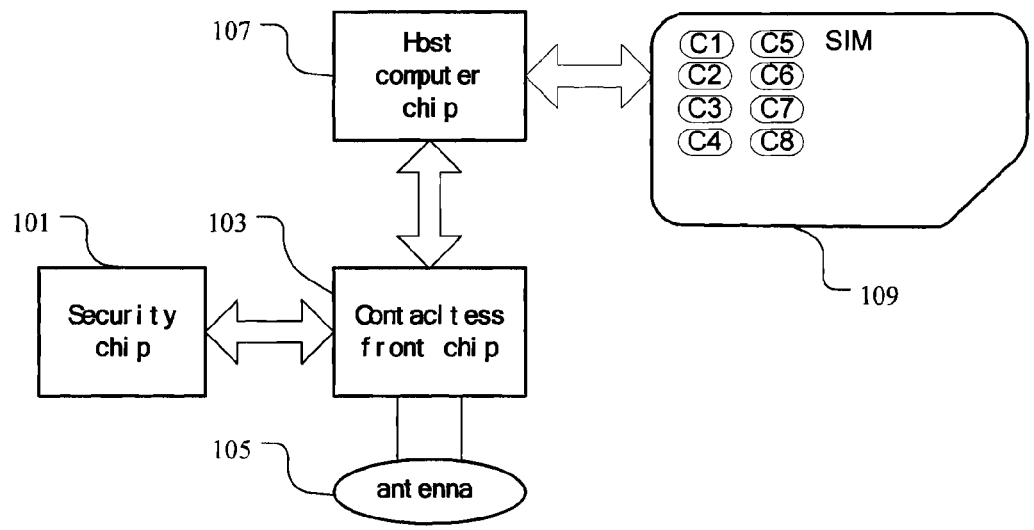
FIG. 1 is a schematic structural view of a conventional contactless communication device.
Figure 2:
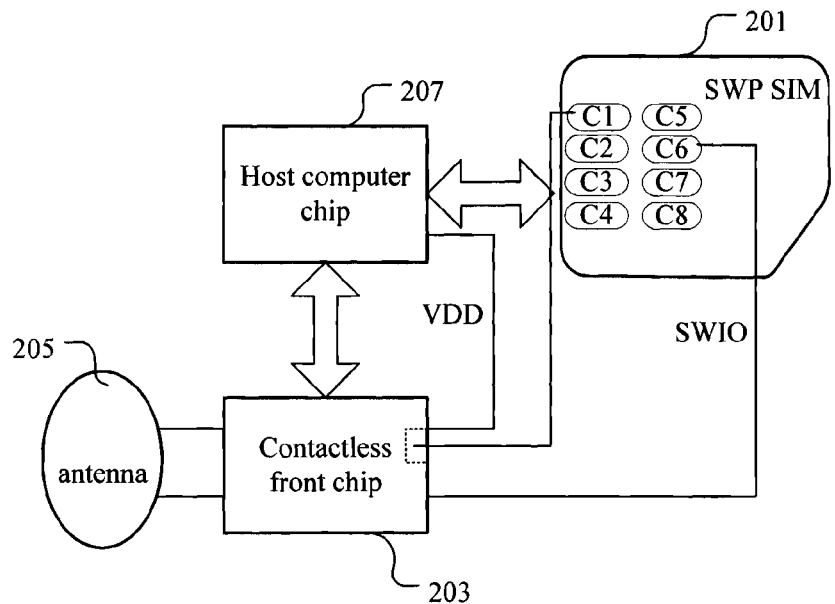
FIG. 2 is a schematic structural view of a conventional contactless communication device based on the signal wire protocol.

Specific embodiments and examples are described herein for illustrative purposes, but the description of illustrated embodiments is not intended to limit the present invention, and equivalent modifications are possible within the scope of this description, as those skilled in the relevant art will recognize.

As described in the background, in the conventional art, solutions based on one-card multiple-use or a dual-interface card is generally applied in the near field communication. As for the one-card multiple-use solution, because different industries have different management modes, laws and policies, it is difficult to combine many kinds of applications. As for the solution based on a dual-interface card, it is difficult to achieve the consistency of contactless radio frequencies.

In view of the above problems, an embodiment of the present disclosure provides a contactless front chip, in which a security chip concentrator is configured to switch between different security chips, so that a contactless communication terminal can be installed with and support multiple security chips synchronously. The contactless communication terminal and the security chips constitute a contactless communication device. The security chip concentrator assembling the multiple security chips is connected with the contactless front chip, so that each security chip can exchange contactless application data with the contactless front chip, which corresponds to different contactless applications. The multiple-card multiple-use solution not only ensures different operators to issue different security chips independently, but also avoids problems of data security, user management, and multiple issues caused by the one-card multiple-use solution.

In embodiments of the present disclosure, the security chips may be integrated in or separated from the contactless communication terminal. Namely, the security chips and the contactless communication terminal may be provided by operators and mobile terminal manufacturing companies respectively. When the security chips are separated from the contactless communication terminal, the mobile terminal manufacturing companies can independently develop and manufacture general contactless communication terminals, which makes division of duties clear-cut in an industrial chain. For consumers, they can freely choose security chips according to their requirements.

In addition, another embodiment of the present disclosure also provides a security chip that is based on a memory card structure. The security chip has an interface which is compatible with contactless communication application technologies, such as interfaces based on SWP or ISO7816, and other suitable interfaces. Specifically, in a security chip supporting SWP, when a contactless front chip the contactless communication terminal has no battery power supply, the contactless front chip still can provide working power for the security chips by creating inductive charges in a contactless field, which greatly expands applications and increases convenience.

In order to clarify the objects, characteristics and advantages of the invention, embodiments of the present disclosure will be described hereinafter in conjunction with attached drawings. It is should be noted that, in embodiments of the present disclosure, the contactless communication terminal includes at least two contactless application interfaces which can be connected with at least two security chips, so as to realize the multiple-card multiple-use function. Moreover, contactless application interfaces which are not connected with the security chips may not influence the security chips connected with other contactless application interfaces. In practical operation, the contactless communication terminal may be a mobile terminal, or other electronic products, such as a portable electronic displayer, and the like. For clearer illustration, a mobile terminal is taken as an example, which is not intended to limit the scope of the present disclosure.

Figure 3:
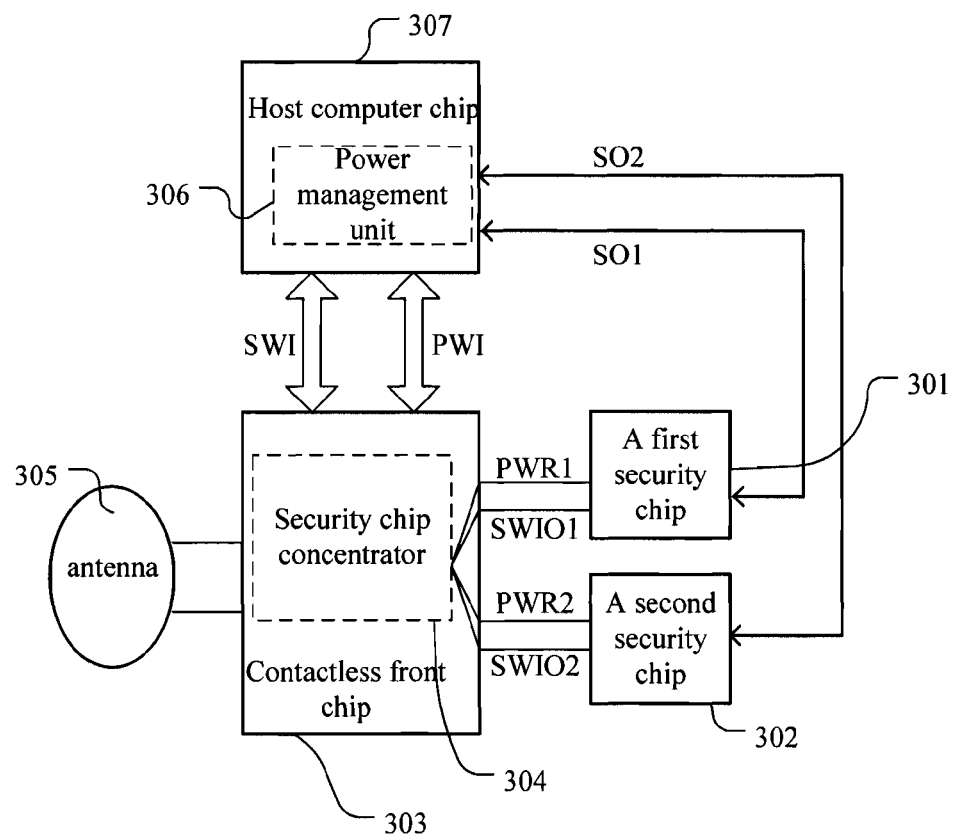
FIG. 3 is a schematic block diagram of a contactless communication device in a first embodiment of the present disclosure.

FIG. 3 is a schematic block diagram of a contactless communication device in a first embodiment of the present disclosure. As shown in FIG. 3, the contactless communication device includes: a first security chip 301, a second security chip 302, a contactless front chip 303, a security chip concentrator 304, an antenna 305, a power management unit 306, and a host computer chip 307.

The first security chip 301 is adapted for storing data for identifying users in mobile communication like a conventional SIM card, and also storing and processing a first contactless application data.

The second security chip 301 is adapted for storing and processing a second contactless application data. The first and second security chips, 301 and 302, constitute a security chipset.

The power management unit 306 is adapted for forming a standard power supply and providing it to the security chip concentrator 304. The power management unit 306 may be integrated in the host computer chip 307, or maybe configured as an independent unit. In a preferable embodiment, the power management unit 306 is integrated in the host computer chip 307, so as to achieve a higher density of integration and a low cost.

In the first embodiment, the contactless communication terminal is a mobile terminal, and the host computer chip 307 is a base band chip which is adapted for data management of mobile communication.

The contactless front chip 303 creates inductive charges in an external contactless field to form a contactless power supply, acquires external contactless application data through the external contactless field, and provides the contactless power supply and the external contactless application data to the security chip concentrator 304. The external contactless field is an electromagnetic field for transmitting data created by an external reader/writer in contactless applications.

The security chip concentrator 304 selects the first or second security chip, 301 or 302, according to different contactless applications, provides the contactless power supply and the external contactless application data to the selected security chip, and provides the contactless front chip 303 with internal contactless application data stored in the security chipset. In the first embodiment, power management unit 306 may be integrated in the host computer chip 307, in order to achieve a higher density of integration and a low cost.

In the first embodiment, a user can choose different contactless applications by the contactless communication device, the user's choice is converted to an instruction by the host computer chip 307, and the instruction is provided to the security chip concentrator 304. In other embodiments, the contactless communication device determines the different contactless applications by itself according to external contactless application information. Besides, when the contactless communication device has no battery power supply, the contactless front chip 303 creates the inductive charges in the external contactless field and provides working power to the first or second security chip 301 or 302 through the security chip concentrator 304.

In the first embodiment, contactless application interfaces between the security chip concentrator 304 and the first and second security chips 301 and 302 may be SWP interfaces, or ISO7816 protocol interfaces. Because multiple security chips are configured in one contactless communication device, area for configuring the security chips and the interfaces is limited, so it is more convenient to use contactless application interfaces based on SWP because of less pins. In a preferable embodiment, the contactless application interfaces between the security chip concentrator 304 and the first and second security chip 301 and 302 are SWP interfaces. Thereinafter, SWP interfaces are taken as an example, which is not intended to limit the scope of the present disclosure.

Referring to FIG. 3, the security chip concentrator 304 assembles a power pin PWR1 and a data pin SWIO1 of the first security chip 301 and a power pin PWR2 and a data pin SWIO2 of the second security chip 302 together and connects them with the contactless front chip 303, the power pin PWR1 and the data pin SWIO1 constitute an contactless application interface of the first security chip 301 which is corresponding to the security chip concentrator 304.

A working process of the contactless communication device in a contactless application is described in detail as follows.

When a user wants to conduct a contactless application, the user firstly selects a specific contactless application. For example, the second security chip 302 corresponding to a second contactless application is selected, then the security chip concentrator 304's power pin and data pin which are connected with the second security chip 302 are selected; in contrast, the data pin connected with the first security chip 301 is inactive, but the power pin connected with the first security chip 301 is not switched off, namely, electrical connection between the power management unit 306 and the first security chip 301 is kept on.

Thereafter, the contactless communication device is moved to be close to the external contactless field, the contactless front chip 303 creates inductive charges to form the contactless power supply, acquires the external contactless application data from the external contactless field, and provides the contactless power supply and the external contactless application data to the security chip concentrator 304. If the contactless communication device works normally, the security chip concentrator 304 selects and provides a standard power supply to the second security chip 302 for the second contactless application, if the contactless communication device has no battery power supply, the security chip concentrator 304 creates and provides the contactless power supply to the second security chip 302 for the second contactless application.

Thereafter, the security chip concentrator 304 exchanges the second contactless application data acquired from the second security chip 302 with the external contactless application data acquired from contactless front chip 303, thereby completing the second contactless application.

At a time, the security chip concentrator 304 selects only one security chip to exchange data with the contactless front chip 303, therefore, conflicts between different contactless applications can be avoided.

In practical operation, the contactless communication device is also adapted for regularly processing contactless application data to realize other applications, such as using the mobile communication function to realize a remote application function, using the data processing function of the contactless communication device to realize a local inquiry function.

The remote application function and the local inquiry function are taken as examples to briefly illustrate a working process of the contactless communication device in other applications.

Hereinafter, the remote application function is described in detail.

As an example, the contactless communication device is a mobile terminal. Because contactless application data, namely smart card application data, is stored in a security chipset, if a user wants to perform a remote application to the data stored in the security chip, a corresponding security chip needs be selected from the security chipset. The remote application can be realized by using a mobile communication function of the mobile terminal. When the mobile terminal works normally, the selected security chip is powered on by a standard power supply, and then, exchanges data with a host computer chip through a general data interface, such as ISO7816 interface, to accomplish reading or writing data in the security chip, thereby realizing the remote application function. In an embodiment, the mobile communication function of the mobile terminal may be based on an Over the Air (OTA) technology of a SIM card to realize communication with remote servers.

In other embodiments, the mobile communication function may be based on wireless network access of the mobile terminal. Specifically, after a security chip is selected by the security chip concentrator 304, the selected security chip is connected with the contactless front chip 303 through contactless application interfaces, and then the contactless front chip 303 exchanges data with the host computer chip 307 through a host computer interface SWI, and realizes remote communication with the remote servers through the wireless network access of the mobile terminal, thereby accomplishing the remote application function.

Hereinafter, the local inquiry function is described in detail.

As an example, the mobile terminal includes a display unit. When a user wants to inquire contactless application data, the host computer chip 307 selects a security chip storing the relative contactless application data from the security chipset, reads the contactless application data stored in the selected security chip through a data interface, processes the contactless application data, and displays the contactless application data in the display unit.

Similar to the remote application function, the local inquiry function can also be realized by reading the contactless application data through the contactless application interface. Namely, the security chips connected with the security chip concentrator 304 are connected with the contactless front chip 303 through the contactless application interfaces, and then the contactless front chip 303 exchanges data with the host computer chip 307 through the host computer interface SWI, so that the contactless application data is read.

It can be seen that, the contactless communication device with combination of contactless applications and other functions can provide multiple application functions, which greatly broadens applications of contactless application data and brings more convenience for users.

The security chips may be integrated in or separated from the contactless communication device. Namely, the security chips and the contactless communication device may be provided by operators and mobile terminal manufacturing companies respectively. In the mode separating the security chips from the contactless communication device, the mobile manufacturing companies can independently develop and manufacture general contactless communication devices, which have a good flexibility. Therefore, the mode separating the security chips from the contactless communication device is preferably used. Interfaces between the security chips and the contactless communication device may support the SWP or the ISO7816 protocol.

A security chip supporting SWP may be in form of a SIM card having SWP interfaces or a conventional main SIM card attached with a super thin SWP card. The super thin SWP card and the conventional main SIM card are put into one SIM card socket together. The super thin SWP card is used for storing contactless application data and it obtains power supply by C1 pin and communicates data by C6 pin.

Furthermore, for the SWP SIM card, the one-card multiple-use technical standard also can be conformed to. Multiple kinds of contactless application data can be synchronously stored in the SWP SIM card, as well as mobile communication data. But the one-card multiple-use solution is mainly applied in applications with relatively low requirements of security and business management. For applications with strict and complex requirements of security and business management, such as bank cards, it is inconvenient and unsafe to use the SWP SIM card supporting the one-card multiple-use function.

In the contactless communication device, besides a SIM card, the detachable card may further include a memory card (for example, a SD card) which is plug in a memory card socket for storing data. Therefore, in an embodiment, the memory card socket may be used as an independent contactless application interface, so as to realize other contactless applications besides mobile communication applications.

Figure 4:
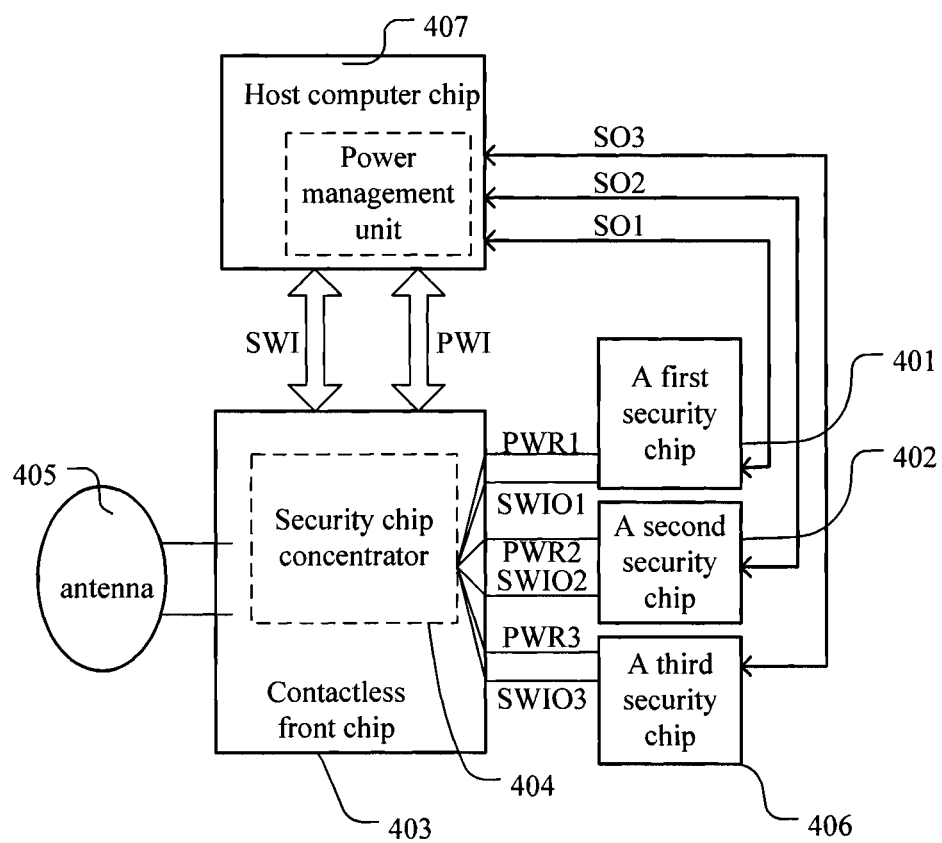
FIG. 4 is a schematic block diagram of a contactless communication device in a second embodiment of the present disclosure.

FIG. 4 is a structural block diagram of a contactless communication device in a second embodiment of the present disclosure. As shown in FIG. 4, the contactless communication includes: a first security chip 401, a second security chip 402, a third security chip 406, a contactless front chip 403, an antenna 405, a security chip concentrator 404 and a host computer chip 407.

The first security chip 401 is adapted for storing data for identifying users in mobile communication like a regular SIM card, and also storing and processing a first contactless application data.

The second security chip 402 is adapted for storing a second contactless application data. The third security chip 406 is adapted for storing a third contactless application data. The first, second and third security chips, 401, 402, and 406, constitute a security chipset.

The host computer chip 407 has a power management unit integrated therein, power management unit which forms a standard power supply and provides it to the security chip concentrator 404. In the second embodiment, the host computer chip 407 may be a base band chip, and adapted for data management of mobile communication.

The contactless front chip 403 creates inductive charges in an external contactless field to form a contactless power supply, acquires external contactless application data from the external contactless field, and provides the contactless power supply and the external contactless application data to the security chip concentrator 404. The external contactless field is an electromagnetic field for transmitting data created by an external reader/writer in contactless applications.

According to different contactless applications, the security chip concentrator 404 selects the first, second, or third security chip, 402, 402 or 406, provides the contactless power supply and the external contactless application data to a selected security chip, and provides the contactless front chip 403 with internal contactless application data stored in the security chipset.

Referring to FIG. 4, the security chip concentrator 404 assembles a power pin PWR1 and a data pin SWIO1 of the first security chip 401, a power pin PWR2 and a data pin SWIO2 of the second security chip 402, and a power pin PWR3 and a data pin SWIO3 of the third security chip 406, and connects them with the contactless front chip 403. The power pin PWR1 and the data pin SWIO1 constitute a contactless application interface of the first security chip 401.

In the second embodiment, all of the first, second and third security chips, 401, 402, and 406 are connected with the security chip concentrator 404 through contactless application interfaces. Both of the first and second security chips 401 and 402 are SWP SIM card chips just like the first embodiment, which is not described in detail herein.

The third security chip 406 includes a structure based on a SD card or other kinds of memory cards, so as to realize pin expansion and support the SWP.

Figure 5:
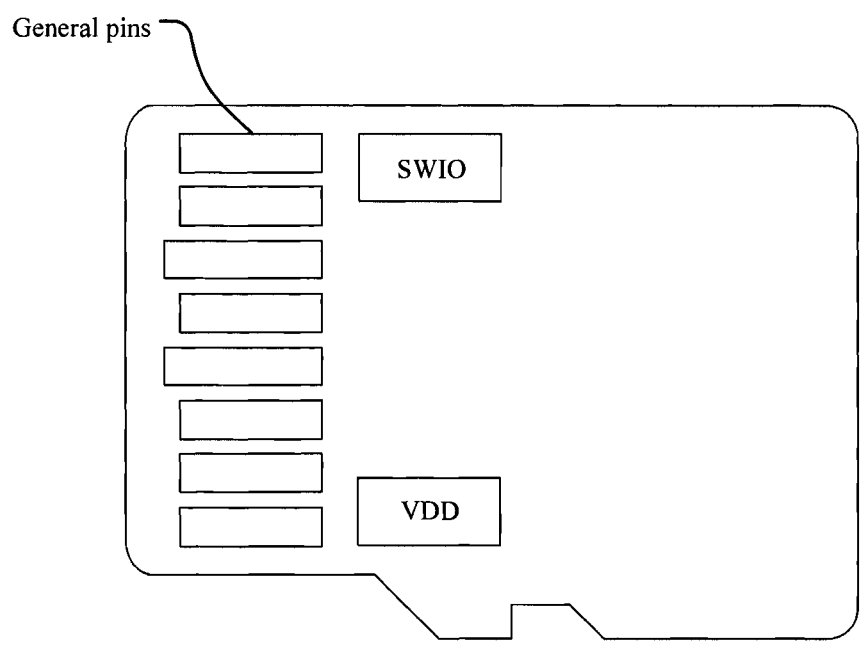
FIG. 5 is a schematic view for illustrating pins of a security chip including a memory card structure in an embodiment of the present disclosure.

FIG. 5 is a schematic view for illustrating pins of a security chip which is integrated in a memory card in an embodiment of the present disclosure.

As shown in FIG. 5, in the embodiment, the security chip is a Micro SD card. Besides a plurality of general pins on one side of the Micro SD card, two more additional pins are expanded besides the general pins and respectively defined as a first pin SWIO and a second pin VDD. The first pin SWIO is connected with a pin of a contactless front chip which is used to transmit contactless application data, and is adapted for exchanging data with the contactless front chip. The second pin VDD is connected with a power pin of the contactless front chip for acquiring working power for the security chip which integrated in SD card.

While the security chip integrated in a memory card is working, the additional first and second pins, SWIO and VDD, do not influence performing general memory functions. And after the contactless front chip acquires energy from an external contactless field and contactless application signals, the security chip integrated in a memory card processes and exchanges data according to the different contactless signals.

In the embodiment, an expansion interface of the security chip integrated in a memory card is based on SWP for realizing the near field communication function, which has the advantages that the near field communication function still can be performed when the contactless communication device has no battery power supply, and all interfaces for contactless applications of the security chip are contactless application interfaces based on SWP, which greatly reduces difficulty of developing the security chip for product suppliers.

In other embodiments, the expansion interface of the security chip integrated in a memory card may be a S2C interface. But the S2C interface need to occupy two pins and a power pin can not be defined thereof like the SWP interface, so that contactless applications can not be supported when the contactless communication device has no battery power supply. In other words, there are some limitations for using the S2C interface.

Besides the Micro SD card structure, the security chip integrated in a memory card may base on a regular SD memory card, a Micro SDHC memory card, or a Memory Stick Micro memory card, which is not intended to limit the scope of the present disclosure.

As described above, the contactless communication device can realize multiple contactless applications by using multiple security chips. For the multiple security chips, at a time, only one security chip is connected with the contactless front chip. The security chips are selected by a power switch unit in the security chip concentrator. After selecting a security chip, the security chip concentrator enables a data pin of the selected security chip to perform data exchange.

Figure 6:
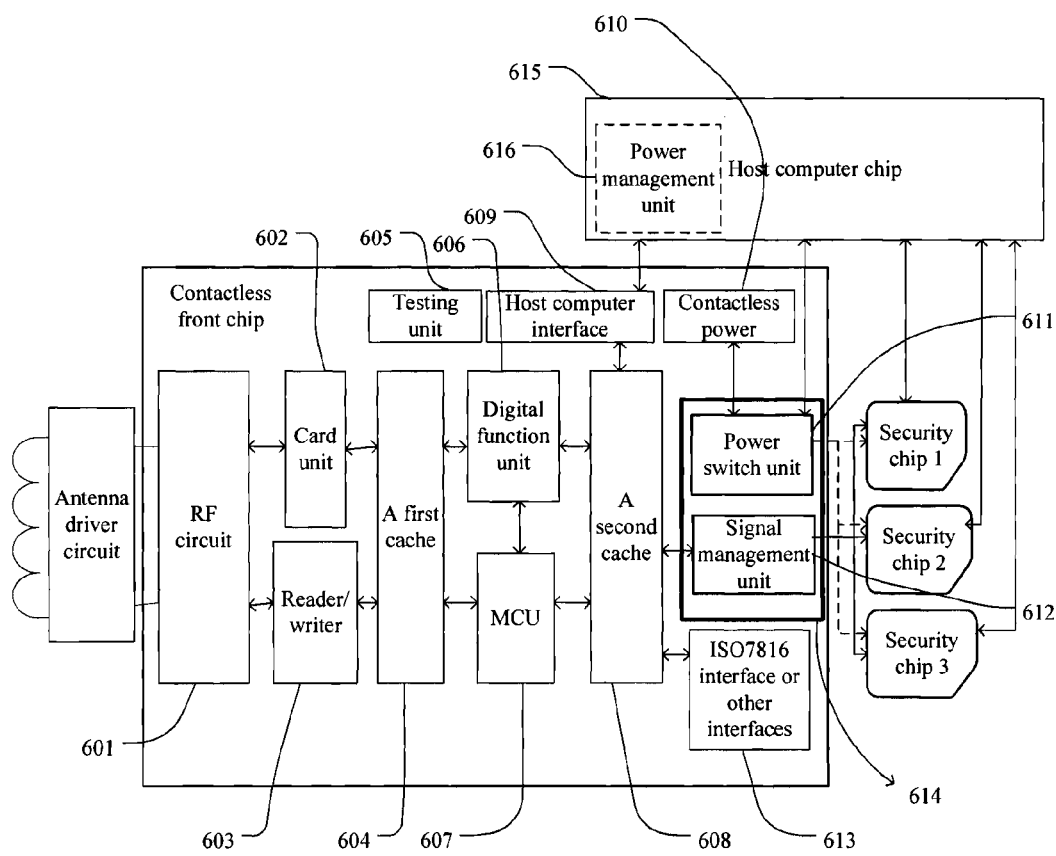
FIG. 6 is a schematic block diagram of a contactless front chip according to an embodiment of the present disclosure.

FIG. 6 is a schematic block diagram of a contactless front chip according to an embodiment of the present disclosure. In the embodiment, a security chip concentrator is integrated in the contactless front chip. In other embodiments, the security chip concentrator may be an independent unit, and not integrated in the contactless front chip, which is not intended to limit the scope of the present disclosure.

As shown in FIG. 6, the contactless front chip includes a radio frequency circuit 601, a card unit 602, a reader writer unit 603, a digital function unit 606, a contactless power unit 610, a micro control unit (MCU) 607, a first cache memory 604, a second cache memory 608, a test unit 605, a host computer interface 609, an ISO7816 (or other interfaces) 613. These units and interfaces have similar functions and connection modes as a conventional contactless front chip, which is not described in detail hereinafter.

Besides, the contactless front chip further includes a security chip concentrator 614 integrated therein. The security chip concentrator 614 includes a power switch unit 611 and a signal management unit 612. The power switch unit 611 is connected with a power management unit 616 of a host computer chip 615 to provide a standard power supply, and is also connected with a security chipset and the contactless power unit 610 of the contactless front chip. A signal management unit 612 is connected with the contactless front chip and the security chipset.

The power switch unit 611 is connected with the contactless front chip and the security chipset, to manage power supply of the security chipset according to working states of the contactless front chip and contactless applications, or to provide power for security chips in the security chipset according to contactless applications.

The signal management unit 612 is connected with the contactless front chip and the security chipset, to select a security chip according to contactless applications and realize data exchange between the contactless front chip and the selected security chip.

For further explanation, a working process of the power switch unit 611 and the signal management unit 612 in an embodiment is described in detail hereinafter. It should be noted that both the power switch unit 611 and the signal management unit 612 may correspond to a security chipset including more than two security chips. In an example embodiment, the security chipset includes three security chips, which is not intended to limit the scope of the present disclosure.

In the embodiment, electronic switches of the power switch unit 611 are adapted for switching power supply to different security chips.

Figure 7A:
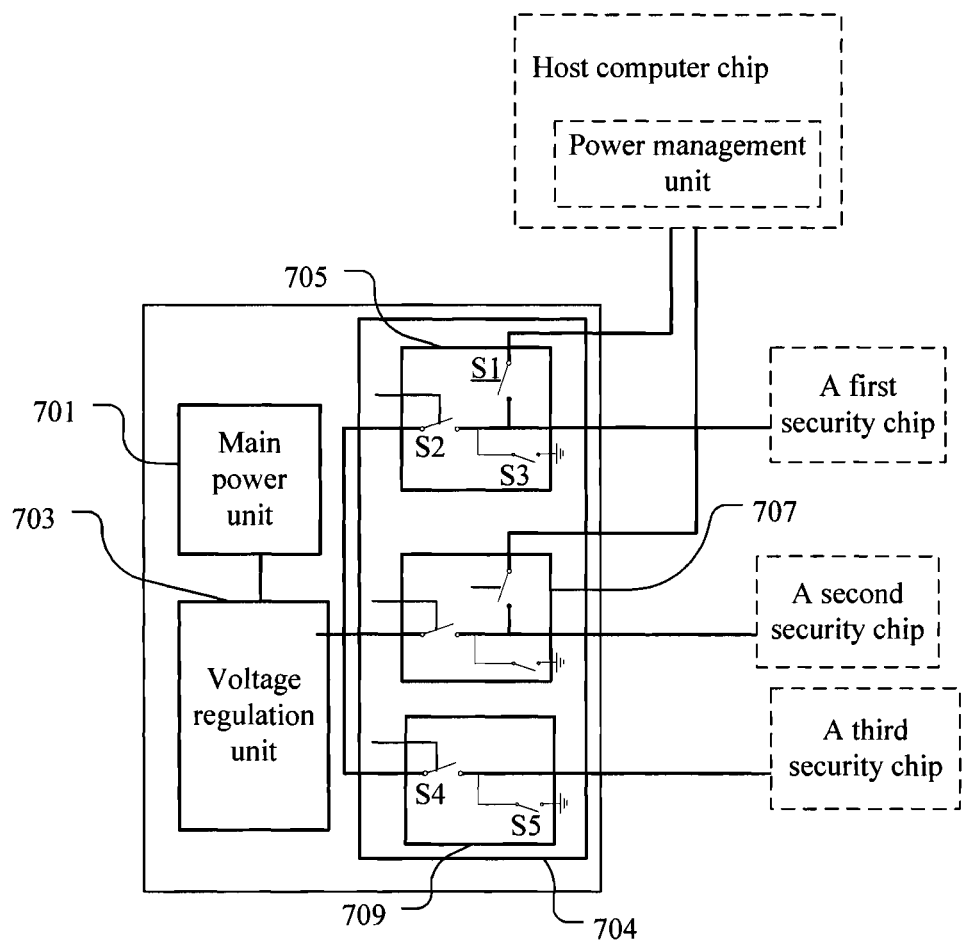
FIG. 7a is a schematic block diagram of a power module of a contactless communication device in an embodiment of the present disclosure.

FIG. 7a is a schematic block diagram of a power module of a contactless communication device in an embodiment of the present disclosure.

As shown in FIG. 7a, the power module includes a main power unit 701, a voltage regulation unit 703 and a power switch unit 704. The Main power unit 701 and the voltage regulation unit 703 are adapted for creating contactless power supply, and both of them are integrated in a same module with the power switch unit 704.

The main power unit 701 obtains energy of a contactless field or a terminal battery to form an original contactless power supply and provide it to the voltage regulation unit 703.

The voltage regulation unit 703 performs a voltage regulation to the original contactless power supply to form the contactless power supply and provides the contactless power supply to a first, second, and third power switch subunits, 705, 707, and 709.

The power switch unit 704 includes three power switch subunits, the first, second, and third power switch subunits, 705, 707, and 709. Each power switch subunit is connected with a security chip. According to different contactless applications, one of the three power switch subunits is selected and provides the contactless power supply to a security chip corresponding to the selected power switch subunit.

Each of the first and second power switch subunits, 705 and 707, includes three input ends controlled by electronic switches, and the three input ends are respectively connected with a host computer chip with an integrated power management unit, the voltage regulation unit 703 and a common voltage end (for example, GND). The third power switch subunit 709 includes two input ends controlled by electronic switches, and the two input ends are respectively connected with the voltage regulation unit 703 and the common voltage end. Each of output ends of the first, second, and third power switch subunits, 705, 707, and 709 is connected with a security chip, and provides working power for a corresponding security chip.

The working principle of the power module is described as follows.

The power supply mode of the power module varies according to different structures of the security chips. Specifically, if the security chips is a SWP SIM card, the power module takes a standard power supply provided by the power management unit or the contactless power supply provided by the contactless front chip as working power of the security chips; if the security chips is integrated in a memory card, the power module only takes a contactless power supply provided by the contactless front chip as working power of the security chips.

Besides, the voltage provided by a standard power supply may be different from that provided by a contactless power supply. To avoid the instability that may be caused by using different voltages to drive the security chips, especially to avoid residual charges adversely influence the security chips while power switching, the residual charges needs to be discharged by a predetermined circuit loop. Therefore, a common voltage end is provided for the security chips for forming a discharging circuit loop.

From above, for the security chips is SWP SIM cards, such as the first and second power switch subunit, 705 and 707 as shown in FIG. 7*a*, a power switch unit corresponding to it needs including three input ends which are respectively configured as a standard power supply end, a contactless power supply end and a common voltage end. While for the security chips is integrated in memory card, due to no need of a standard power supply driving, a power switch unit corresponding to it includes two input ends which are respectively configured as a contactless power supply end and a common voltage end.

A working process of the power switch subunits is described in detail as follows.

Because the circuit structure of the second power switch subunit 707 is the same as that of the first power switch subunit 705, only the working process of the first power switch subunit 705 is described hereinafter for exemplary purposes, which is not intended to limit the scope of the present disclosure.

As shown in FIG. 7*a*, the first power switch subunit 705, which is connected with a first security chip which is a SWP SIM card, includes three electronic switches connected in parallel with each other: a first switch S1 connected with a standard power supply provided by a power management unit, a second switch S2 connected with a contactless power supply provided by the voltage regulation unit 703, and a third switch S3 connected with a common voltage end.

Working modes of a contactless communication device can be divided into three modes: a normal operating mode, a low-power mode (for example, a sleep mode) and a shut down mode. The three working modes of the first power switch subunit are respectively described in detail hereinafter (working modes of the second power switch subunit is same as the first power switch subunit).

The Normal Operating Mode

If no contactless application request is received by the contactless communication device, the first switch S1 is turned on, the second and third switches S2 and S3 are turned off, and the first security chip receives a standard power supply provided by a power management unit and takes the standard power supply as it's working power.

After a contactless application request is received, the contactless communication device analyzes power supply of the first security chip, to determine if the first security chip is in normal operating mode. If yes, states of the first, second and third switches are unchanged. After the contactless application is finished, a contactless front chip provides the result about the contactless application request to the first power switch subunit 705, and the first power switch subunit 705 keeps the states of the first, second and third switches unchanged.

The Low-Power Mode

The low-power mode is a mode in which the contactless communication device stops supplying power for most internal units to reduce energy consumption, like a sleep mode. In the low-power mode, if no contactless application request is received, the second and third switches S2 and S3 are turned off and the first switch S1 is turned on, but no power is provided for the first security chip because no standard power supply is provided by the power management unit.

After a contactless application request is received, the contactless front chip analyzes power supply of the first security chip, to determine if the first security chip is in the low-power mode. If yes, the contactless front chip turns off the first switch S1 and turns on the second switches S2 to provide power for the first security chip. Here, the contactless front chip also can obtain power from a battery to generate a contactless power supply, and the first security chip receives the contactless power supply from voltage regulation unit 703 through the second switch S2 and takes the contactless power supply as its working power. In addition, data exchange between the first security chip and the contactless front chip is also accomplished herein. After the contactless application is done, the second switch S2 is turned off, and the first switch S1 is turned on. But the contactless communication device does not provide power for the first security chip because it is still in the low-power mode.

In practical, the voltage provided by the contactless power supply may not exactly match the voltage provided by the standard power supply. To avoid residual charges caused in power switching process adversely influencing the security chips, the residual charges needs to be discharged. In a preferable embodiment, when changing the contactless communication device from the low-power mode to the normal operating mode, before the first switch S1 is turned on, the third switch S3 needs be turned on for a short period, so that the residual charges of the first security chip can be discharged through a common voltage end, which can make sure the first security chip is in a good power on or power off state, so as to avoid instability of the first security chip.

The Power Off Mode

If no contactless application request is received, all circuits of the contactless communication device in the power off mode are powered off, therefore, the first, second and third switches S1, S2, and S3 are not working.

After a contactless application request is received, the contactless front chip is waked up by an alternating magnetic field, and contactless front chip then checks an electrical quantity of the battery: if the battery still can provide power, the contactless front chip obtains power from the battery, converts the power to a contactless power supply and provides the contactless power supply to the first security chip; if the battery can not provide power (or there is no battery configured therein), the contactless front chip obtains inductive power from a contactless field, converts the inductive power to a contactless power supply and provides the contactless power supply to the first security chip. Therefore, the second switch S2 connected with the voltage regulation unit is turned on and other switches are turned off.

After data exchange of the contactless application is finished, the contactless front chip stops providing the contactless power supply because the contactless field is unavailable, therefore, all circuits and switches are powered off.

In the embodiment, the first, second and third switches S1, S2, and S3 may be realized by PMOS transistors, in which the gate of PMOS transistor is used as a control end to control the on or off state, and the drain and source of the PMOS transistor are respectively connected with the first security chip and the voltage regulation unit.

The third security chip, which is connected with the third power switch subunit 709 is a memory card with SWP interface, includes expansion pins (the first pin SWIO and the second pin VDD shown if FIG. 5). Therefore, the third security chip does not have to share a power pin with a standard memory card interface, and accordingly, the third power switch subunit 709 does not have to include an electronic switch connected with the standard memory card interface and only includes a fourth switch S4 connected with voltage regulation unit 703 and a fifth switch S5 connected with the common voltage end. Besides, unlike the first power switch subunit 705 having a power pin which is shared with the standard memory card, and is connected to the power management unit of the host computer chip for multiplexing, the following problems may be avoided in the third power switch subunit 709: the standard memory card interface includes a bi-directional data pin, when the third security chip takes the contactless power supply as its working power and the host computer chip is powered off, there may be a leakage from memory card to the host computer chip through the Electric Static Discharge (ESD) circuit of the bi-directional data pin, which makes the third security chip work abnormally.

The working process of the third power switch subunit 709 is briefly described as follows.

Generally, if no contactless application request is received, the fourth and the fifth switch S4 and S5 are turned off and the third security chip does not work; after a contactless application request is received, the fourth switch S4 is turned on to receive the contactless power supply provided by the voltage regulation unit 703 and takes the contactless power supply as its working power, and meanwhile, the fifth switch is kept off; after the contactless application is done, the fourth switch S4 is turned off and the fifth switch S5 is turned on for a short moment to release residual charges in the third security chip, and then the fifth switch S5 is turned off.

In an alternative embodiment, the third power switch subunit 709 only includes the fourth switch S4 which is connected with the voltage regulation unit 703 and the third security chip, and does not includes the fifth switch which is connected with the common voltage end and the third security chip. For a power switch subunit including this kinds of structure, its working process is described as follows.

1. A Normal Operating Mode

If no contactless application request is received, the fourth switch S4 is kept off; after a contactless application request is received, the fourth switch S4 is turned on; and after the contactless application is done, the fourth switch S4 is turned off.

2. A Power Off Mode

In this mode, the contactless communication device and all circuits are powered off, therefore, the fourth switch S4 is not working.

After a contactless application request is received, the contactless front chip is waked up by an alternating magnetic field, and thereafter, the contactless front chip checks an electrical quantity of a battery: if the battery can provide power, the contactless front chip obtains power from the battery, converts the power to the contactless power supply, turns on the fourth switch S4, and provides the contactless power supply to the third security chip; if the battery can not provide power (or there is no battery configured herein), the contactless front chip obtains inductive power from the contactless field, converts the inductive power to the contactless power supply, turns on the fourth switch S4, and provides the contactless power supply to the third security chip.

After data exchange of the contactless application is finished, the contactless front chip stops providing the contactless power supply because the contactless field is unavailable, therefore, all circuits and switches are powered off.

The above is the working process of the power switch unit 704. It should be noted that, even though the power switch unit 704 includes multiple contactless application interfaces, only state of the switches corresponding to one selected contactless application interface will be changed when it is needed, and state of the switches corresponding to other unselected contactless application interfaces will be unchanged, which ensures that different security chips can perform contactless applications independently.

Figure 7B:
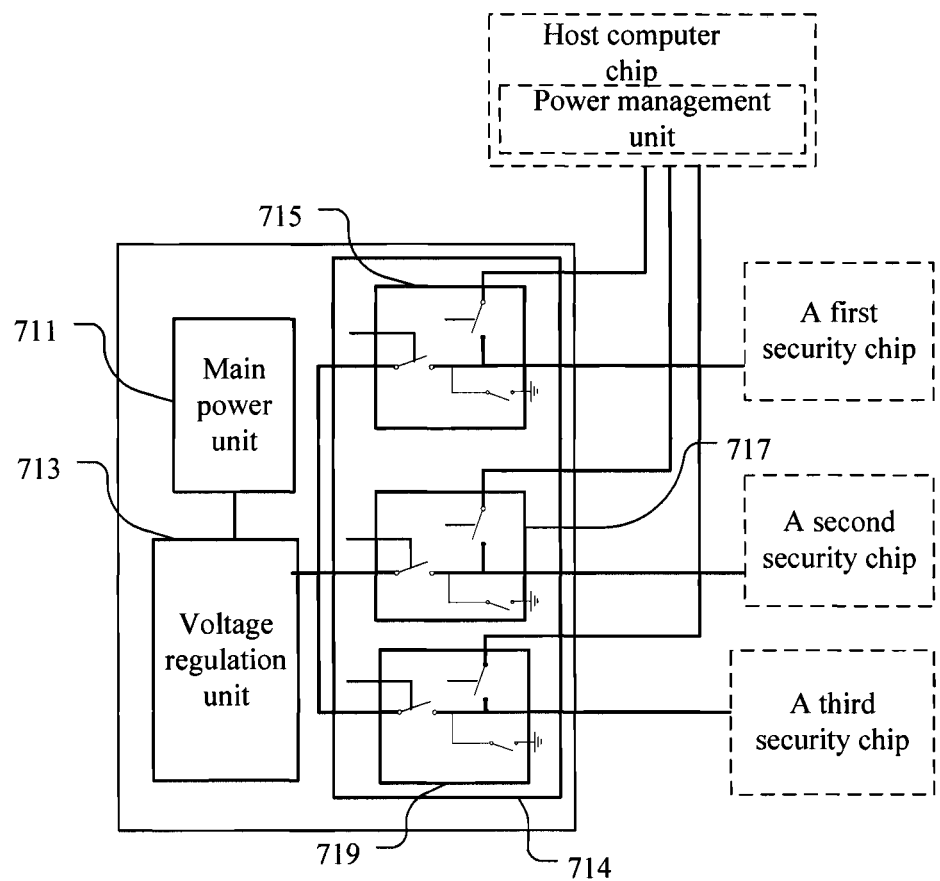
FIG. 7b is a schematic block diagram of a power module of a contactless communication device in another embodiment of the present disclosure.

FIG. 7b is a schematic block diagram of a power module of a contactless communication device in another embodiment. As shown in FIG. 7b, the power module includes a main power unit 711, a voltage regulation unit 713 and a power switch unit 714. Structures of the main power unit 711 and the voltage regulation unit 713 are the same as those of the main power unit 701 and the voltage regulation unit 703 in FIG. 7a, which is not described in detail hereinafter. However, the structure of the power switch unit 714 is different from the power switch unit 704 in FIG. 7a.

Specifically, the power switch unit 714 includes three power switch subunits, a first, second and third power switch subunits, 715, 717 and 719. And all of the power switch subunits includes the same structure as that of the first power switch subunit 705 in FIG. 7a, namely each of them includes three input ends controlled by electronic switches, and the three input ends are respectively connected with a host computer chip connected with an external power management unit, a voltage regulation unit 713 and a common voltage end. Each of the power switch subunits is connected with a security chip through its output end and provides working power for the corresponding security chip.

Because all of the three power switch subunits include the same structure as that of the first power switch subunit 705 in FIG. 7a, in practical operation, each power switch subunit of power switch unit 714 may be connected with a security chip which is a SWP SIM card or is integrated in a memory card. For a power switch subunit connected with a security chip which is a SWP SIM card, its working modes are the same as those of the first power switch subunit 705 in FIG. 7a, so are working modes of the power switch subunit connected with a security chip integrated in a memory card. Namely, the three input ends of each power switch subunit can respectively connect a host computer chip connected with an external power management unit, a voltage regulation unit 713 or a common voltage end with the security chip integrated in a memory card, so that the security chip integrated in a memory card still can obtain working power while no contactless application is performing, which can enhance the compatibility between the contactless communication device and the security chip.

In the embodiment, the signal management unit is adapted for selecting a security chip and realizing bi-direction data transmission between the contactless front chip and the selected security chip.

Because the contactless communication device is achieved by expanding conventional contactless application interfaces, interfaces of the signal management unit is completely compatible with signals of contactless applications in the prior art, such as SWP signals. Definition and specification of the SWP signals are available in ETSI TS102 613 standard, which is not described hereinafter. Hereinafter, only signals for bi-direction communication between the contactless front chip and the selected security chip are described.

In order to realize bi-direction communication between a contactless front chip and a security chip, there are two kinds of signals defined in SWP: a first signal SIG1 which is transmitted from the contactless front chip to the security chip, in which RZ coded voltages are used to represent logical one and logical zero; a second signal SIG2 which is transmitted from the security chip to the contactless front chip, in which the logical one and logical zero is modulated in current domain. Therefore, when the contactless front chip receives data signals from the security chip, the front chip need to demodulate the second signal SIG2 to obtain the data.

Figure 8:
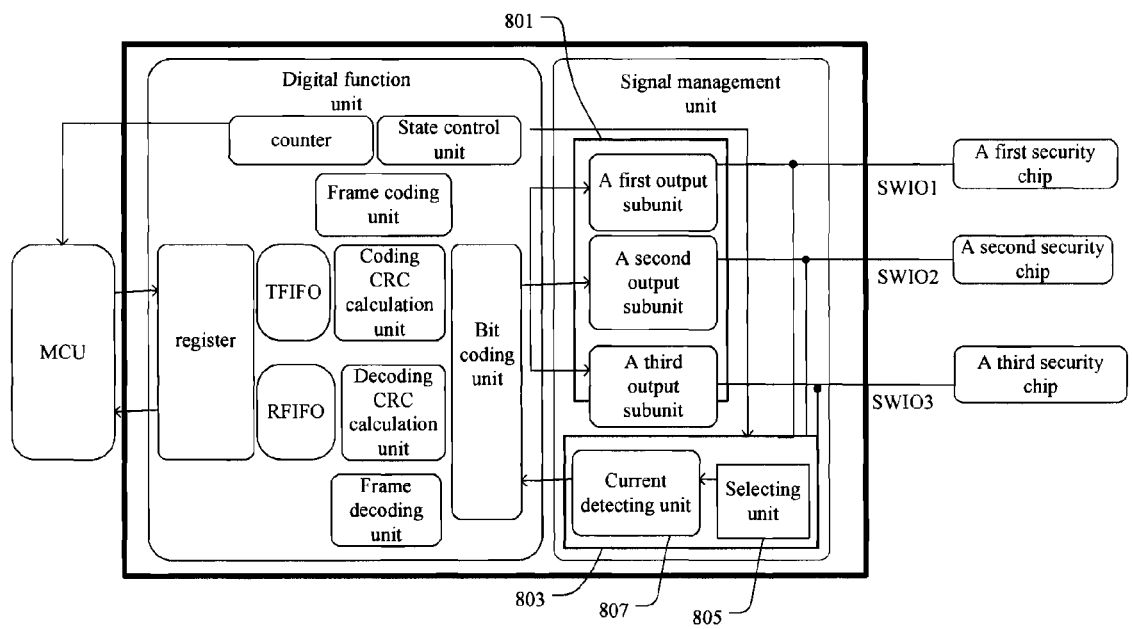
FIG. 8 is schematic view of a signal processing circuit in a contactless communication device in an embodiment of the present disclosure.

FIG. 8 is schematic view of a signal processing circuit in a contactless communication device in an embodiment of the present disclosure.

As shown in FIG. 8, the signal processing circuit includes two parts, a digital function unit and a signal management unit. The digital function unit is a digital function unit 606 shown in FIG. 6 (for illustration purposes, a second cache is not shown), including a counter, a state control unit, a register, a TFIFO, a RFIFO, a frame coding unit, a coding CRC calculation unit, a frame decoding unit, a decoding CRC calculation unit and a bit coding unit. Because only one security chip communicates with the contactless front chip while performing each contactless application, the connection way and function of the digital function unit is mostly the same as that in the prior art, except that the state control unit creates different control signals according to different contactless applications, so as to select a corresponding security chip.

The signal management unit includes a voltage output unit 801 and a voltage input unit 803.

The voltage output unit 801 includes three voltage output subunits connected in parallel with each other, and each of the voltage output subunits corresponds to a security chip and provides data output by a SWP digital function unit (the first signal SIG1 created by the RZ coding) for the corresponding security chip.

The voltage input unit 803 includes a selecting unit 805 and a current checking unit 807. The selecting unit 805 receives multiple current signals output by multiple security chips (the second signal SIG2 modulated by the load current), and selects a current signal according the control signal provided by the state control unit and provides the selected current signal to the current checking unit 807. The current checking unit 807 converts the selected current signal to a voltage signal and provides the voltage signal to the digital function unit.

In conclusion, cross-industry cooperation in building a near field communication application environment can be achieved with the contactless communication device provided in the embodiments of the present disclosure. Different operators can independently issue security chips which are separated from the contactless communication device, so that problems caused by the one-card multiple-use solution can be avoided, such as data security, user management, and the like. In addition, the contactless communication device includes multiple security chips which support SWP, so that the contactless communication device still can perform contactless applications even when it is has no battery power supply, which greatly broaden applications of contactless applications.

Although the present invention has been disclosed as above with reference to preferred embodiments, it is not intended to limit the present invention. Those skilled in the art may modify and vary the embodiments without departing from the spirit and scope of the present invention. Accordingly, the scope of the present invention shall be defined in the appended claim.

What is claimed is:

1. A contactless communication device, comprising: a contactless front chip, a security chip concentrator and a security chipset, wherein the security chipset comprises more than two security chips and is adapted for storing and processing contactless application data, wherein the contactless front chip is adapted for realizing interaction between the security chips and an external contactless field, and wherein the security chip concentrator is connected with the security chips and the contactless front chip, and the security chip concentrator is adapted for selecting a security chip according to a contactless application and realizing connection between the selected security chip and the contactless front chip.

2. The device according to claim 1, wherein the contactless front chip is also adapted for acquiring power from the external contactless field and providing the power for the selected security chip.

3. The device according to claim 1, wherein the security chipset is connected with a power management unit of the contactless communication device through the contactless front chip and inputs power supply provided by the power management unit to the security chips.

4. The device according to claim 3, wherein the security chip concentrator comprises: a power switch unit, connected with the power management unit, the contactless front chip, and the security chipset, and adapted for managing power supply of the security chipset and providing power for a selected security chip according to a state of the contactless communication device; and a signal management unit, connected with the contactless front chip and the security chipset, and adapted for realizing interaction between the contactless front chip and the selected security chip.

5. The device according to claim 1, wherein the security chip concentrator is connected with a host computer chip of the contactless communication device through the contactless front chip and selects a security chip according to instructions from the host computer chip.

6. The device according to claim 1, wherein the security chip concentrator is connected with a host computer chip of the contactless communication device, and the host computer chip realizes regular data processing by exchanging data with the security chips.

7. The device according to claim 1, wherein the security chip concentrator comprises: a power switch unit, connected with the contactless front chip and the security chipset, and adapted for managing power of the security chipset according to contactless applications and states of the contactless communication device and providing power for a selected security chip according to the contactless applications; and a signal management unit, connected with the contactless front chip and the security chipset, and adapted for realizing interaction between the contactless front chip and the selected security chip.

8. The device according to claim 1, wherein the security chip concentrator and the security chips realize connection by using interfaces based on the single wire protocol.

9. The device according to claim 1, wherein each of the security chips comprises a SIM card structure or a memory card structure supporting the single wire protocol.

10. The device according to claim 9, wherein a security chip having a memory card structure comprises two expansion pins, a first pin and a second pin, wherein the first pin is adapted for exchanging contactless application data with the security chipset and the second pin is adapted for acquiring power supply.

11. The device according, to claim 1, wherein the security chip concentrator is integrated in the contactless front chip.

12. The device according to claim 5, wherein the host computer chip comprises a base band chip.

13. A security chip concentrator, configured in a contactless communication device, comprising:
a plurality of contactless application interfaces which are adapted for connecting security chips, so as to connect a security chipset with a contactless front chip, wherein the security chipset comprises one or more security chips;
a power switch unit and a signal management unit, wherein the power switch unit, connected with the contactless front chip and the security chipset, and adapted for managing power of the security chipset according to contactless applications and states of the contactless communication device and providing power for a selected security chip according to the contactless applications; and wherein the signal management unit, connected with the contactless front chip and the security chipset, and adapted for realizing interaction between the contactless front chip and the selected security chip.

14. The security chip concentrator according to claim 13, wherein the contactless communication device further comprises a power management unit, and the power switch unit is also connected with the power management unit and provides power for a selected security chip according to states of the contactless communication device.

15. The security chip concentrator according to claim 14, wherein the power switch unit comprises a plurality of power switch subunits, each power switch subunit corresponds to a security chip and comprises three electronic switches: a first switch connected with the power management unit and the security chips, a second switch connected with the contactless front chip and the security chips, and the third switch connected with a common voltage end and the security chips.

16. The security chip concentrator according to claim 15, wherein the power switch subunits are adapted for turning off or turning on the electronic switches according to working state signals of the contactless communication device, wherein when the contactless communication device is in a normal operating mode, the first switch is turned on, the second and third switches are turned off, a power switch subunit takes a standard power supply provided by the power management unit as a corresponding security chips working power, and a contactless application request provided by the contactless front chip does not change states of the first, second and third switch, wherein when the contactless communication device in a low-power mode, if no contactless application request is received, the second and third switch are turned off and the first switch is turned on, and the power passing through the first switch is not provided to a corresponding security chip; after a contactless application request is received, the first switch is turned off, the second switch is turned on, the third switch is kept off, a power switch subunit takes a standard power supply provided by the power management unit as a corresponding security chip's working power supply; and after the contactless application is done, the second switch is turned off, the first switch is turned on, the third switch is turned on for a short period to release residual charges of the corresponding security chip through the common voltage end, and then the third switch is turned off, and wherein when the contactless communication device in a power off mode, before the contactless communication device comes into a contactless field, the contactless front chip has no battery power supply; after the contactless communication device comes into the contactless field, the contactless front chip is powered on by inducing the contactless field and determining whether there are contactless applications in the contactless field or not; after a contactless application request is received, the second switch is turned on and the first and third switch are turned off, and a power switch subunit takes a power supply provided by the contactless front chip as a corresponding security chip's working power supply; and after the contactless application is done, the contactless front chip leaves the contactless field and stops acquiring power from the contactless field, therefore, the first, second and third switches are turned off.

17. The security chip concentrator according to claim 13, wherein the power switch unit comprises a plurality of power switch subunits, each power switch subunit corresponds to a security chip and further comprises a fourth switch connected with the contactless front chip and the security chips.

18. The security chip concentrator according to claim 17, wherein the power switch subunits are adapted for turning off or turning on the electronic switches according to working state signals of the contactless communication device, wherein when the contactless communication device in a normal operating mode, if no contactless application request is received, the fourth switch is kept off; after a contactless application request is received, the fourth switch is turned on; and after the contactless application is done, the fourth switch is turned off, and wherein when the contactless communication device is in a power off mode, before the contactless communication device comes into a contactless field, the contactless front chip has no battery power supply; after the contactless communication device comes into the contactless field, the contactless front chip is powered on by inducing the contactless field and determining whether there are contactless applications in the contactless field or not; and after a contactless application request is received, the fourth switch is turned on, and a power switch subunit takes a power supply provided by the contactless front chip as a corresponding security chip's working power supply; and after the contactless application is done, the contactless front chip leaves the contactless field and stops acquiring power from the contactless field any more, therefore, the fourth switch is turned off.

19. The security chip concentrator according to claim 13, wherein the signal management unit comprises an input unit and an output unit, wherein the output unit comprises more than two output subunits connected in parallel with each other, each of the output subunits corresponds to a security chip and provides contactless application data output by the contactless front chip for a corresponding security chip, and wherein the input unit comprises a selecting unit and a current checking unit, the selecting unit receives current signals output by the security chips, selects a current signal according to a control signal provided by a state control unit of the contactless front chip and provides the selected current signal to the current checking unit, and the current checking unit converts the selected current signal to a voltage signal and provides the voltage signal to a digital function unit of the contactless front chip.

* * * * *